(No Model.) 2 Sheets—Sheet 1.
P. J. KEARNS & J. N. KELLY.
GAGE FOR MEASURING HORSES' FEET AND HOOFS.
No. 583,706. Patented June 1, 1897.
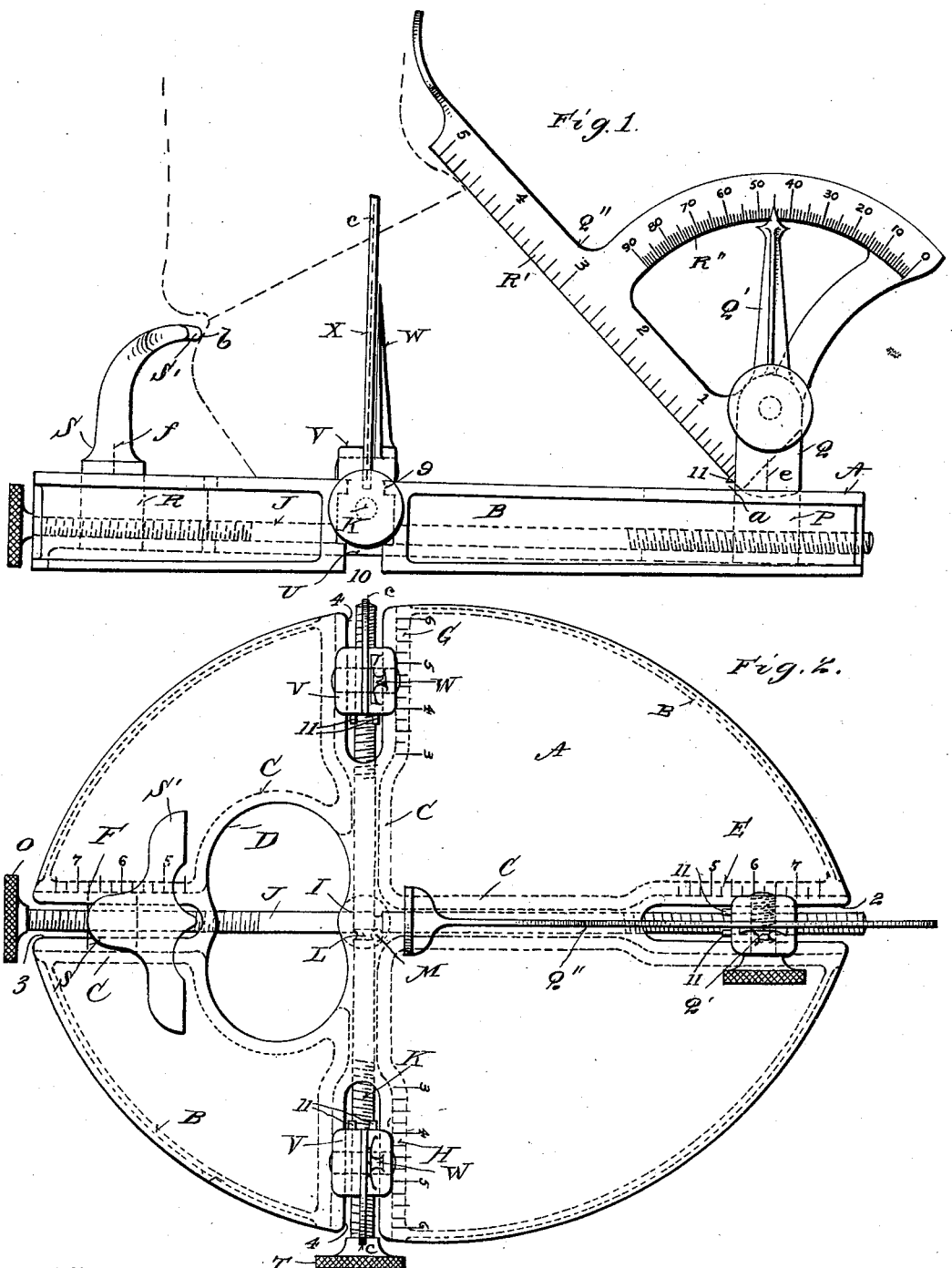
Witnesses
Jas. C. Dawley
W. M. McNair
Inventor
Patrick J. Kearns
Joseph N. Kelly
By their Attorney,
H. A. Toulmin.

(No Model.) 2 Sheets—Sheet 2.
P. J. KEARNS & J. N. KELLY.
GAGE FOR MEASURING HORSES' FEET AND HOOFS.
No. 583,706. Patented June 1, 1897.
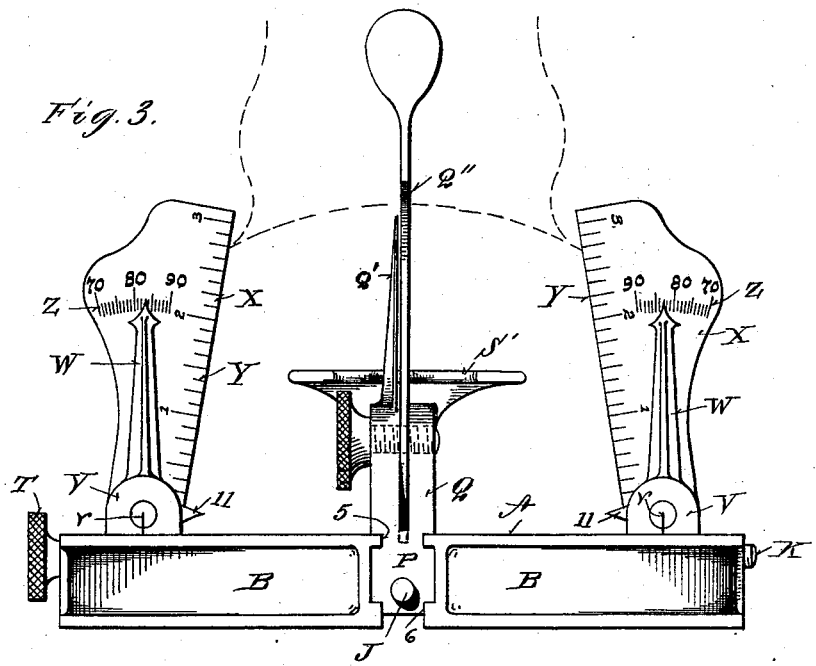
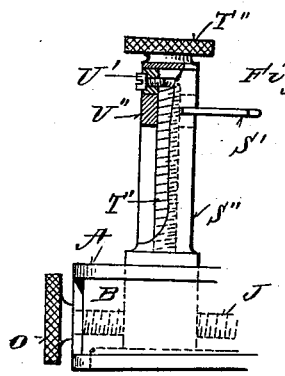
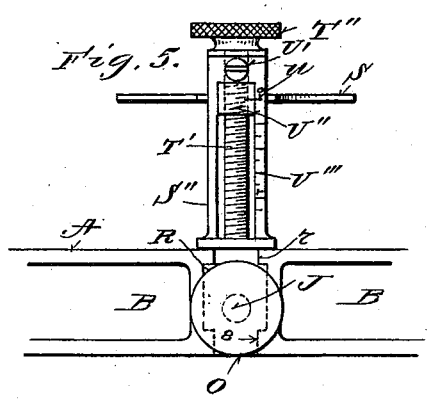
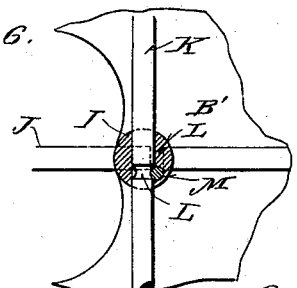
Witnesses
Jas. C. Dawley
W. M. McNair
Patrick J. Kearns, Inventors
Joseph N. Kelly,
By their Attorney
H. A. Toulmin

UNITED STATES PATENT OFFICE.

PATRICK JAMES KEARNS, OF SPRINGFIELD, AND JOSEPH N. KELLY, OF DAYTON, OHIO.

GAGE FOR MEASURING HORSES' FEET AND HOOFS.

SPECIFICATION forming part of Letters Patent No. 583,706, dated June 1, 1897.

Application filed May 6, 1896. Serial No. 590,411. (No model.)

*To all whom it may concern:*

Be it known that we, PATRICK JAMES KEARNS, residing at Springfield, in the county of Clark, and JOSEPH N. KELLY, residing at Dayton, in the county of Montgomery, State of Ohio, citizens of the United States, have invented certain new and useful Improvements in Instruments for Measuring Horses' Feet or Hoofs, of which the following is a specification, reference being had therein to the accompanying drawings.

This invention relates to a machine for measuring horses' feet or hoofs. It is now known that the more perfectly a horse is shod the greater the speed that may be made by him and the less liable he is to injure himself. To this end it is of the utmost importance that means be provided by which it can be accurately and quickly determined whether the bottom or tread of the hoof is perpendicular to the line of the center of gravity, so that the foot will stand perfectly level and will not be slightly down on one side and slightly up on the other, or slightly up at the heel or toe, or vice versa. This instrument makes it possible to determine with absolute accuracy when the bottom tread of the hoof is not perpendicular and when it is perpendicular to such line. It is also well known that there is a preferred inclination or angle of the front of the hoof in order to obtain the best speed with the least inconvenience to the horse. This preferred angle is forty-five degrees, which has been selected largely in consequence of the fact that the front hoofs of the celebrated race-horse Nancy Hanks when she made her record of one mile in 2.04 were forty-five degrees along their extreme front surface. In speaking of the angle of forty-five degrees we refer to the front hoofs only. For the hind hoofs an angle of forty-seven degrees is preferred, because of the pushing function of those hoofs.

Our instrument enables us to quickly ascertain the angle of inclination of the front surface of the hoofs, which, in conjunction with the devices of our instrument by which the perpendicularity of the tread or bottom of the hoof to the line of gravity is determined, enables us to measure the hoof and to correct any departure from the proper lines with accuracy.

Our instrument also enables us to take the longitudinal and lateral measurements of the hoof in inches, as also to take the height of the quarters and the angle of the hoofs along the quarter-lines.

In the accompanying drawings, on which like reference-letters indicate corresponding parts, Figure 1 is a side elevation of our improved instrument, showing the hoof thereon in dotted lines; Fig. 2, a plan view of the instrument; Fig. 3, a front elevation of the instrument; Fig. 4, a partial side view and section, and Fig. 5 a rear elevation of a part of the base and of the heel-post; and Fig. 6, a partial plan and sectional view of the hub and adjusting-shafts.

A suitable base A, of metal or other material, is adapted to rest upon the floor or other surface and to receive upon it the hoof or foot of the horse, as suggested in Figs. 1 and 3 by the dotted lines. By preference this base is of the outlines shown in Fig. 2. Its upper and lower surfaces are separated by intervening webs B, which render the base hollow. Interior webs C (shown in dotted lines) serve to make the base strong. At D an opening is preferably made to lighten and improve the appearance of the base. At the toe this base has a scale E representing inches, and at the heel the scale F representing inches, and at each side or corresponding to the quarters of the hoof other scales G and H, also representing inches. The toe and heel scales are used in measuring the length of the hoofs from the toe to the cleft of the frog, the point we term the "toe" being shown at $a$ and the cleft at $b$. The scales G and H are used in measuring the width of the hoof at the point we call the "quarter," which, as the term implies, is a point half-way in the circumference of the upper end of the hoof, measuring from the front opposite the center to the back or heel opposite the center. The quarter-line is shown by the dotted line $c$.

Where the longitudinal center of the hoof intersects a transverse line drawn from one quarter-line to the other across the center of gravity, as has been ascertained by investigations into the anatomy of the hoof and leg, this center of gravity and the center of our instrument are coincident when the hoof is upon the base. The letter I designates what we term the "hub" of the instrument, and the center of this hub is the center of the instrument and is in line with the center of gravity of the hoof when the hoof is clamped between the toe and heel posts and the quarter-posts, as will presently appear. This hub is securely fastened to the lower plate B' of the base, as shown in Fig. 6. It is bored in two directions to receive the shaft J of the toe and heel posts and the shaft K of the quarter-posts. Each shaft is grooved, as seen at L, and a pin M is inserted to fit the grooves, so that the shafts can revolve but cannot have longitudinal movement. The shaft J is right and left hand screw-threaded and has a milled head O to manipulate it by hand. The screw-threaded portions of the shaft pass through the shank P of the toe-post Q and the shank R of the heel-post S, respectively, so that by rotating the shaft the posts will each move to or from the center of the instrument. By this means the posts are adjusted to receive the hoof, as shown in Fig. 1, and are brought up to the hoof irrespective of the size thereof. By observing at what point in the scales E and F the scale-lines e f (dotted in Fig. 1) stand when the hoof is clamped the longitudinal length of the hoof is in inches. This length is from the toe of the hoof to the cleft of the frog. The shaft K is also right and left hand screw-threaded and provided with a milled head T to rotate it by hand. The threaded portions pass through the shanks U of the side or quarter posts V, so that these posts will slide to and from the center of the hub I, according to the direction in which the shaft is rotated. These posts V have fixed points W and pivoted scale-plates X, each having a scale Y of inches and a scale Z of degrees. The inches give the height of the hoof at the quarter, in making which measurement the plates X stand as shown in Fig. 3.

In taking the angle or inclination of the hoof along the quarter-lines the plates are slanted, as shown in Fig. 3, and the degrees of inclination are read on the scale Z in connection with the pointers W. To determine the width of the hoof at the quarter-lines, resort is had to the scales G and H, which are read in connection with the reading-lines v on the post V.

A convenient mode of slidingly mounting the toe and heel posts Q and S and the quarter-posts V consists in slotting the base, as indicated at 2, 3, and 4, and in grooving or rabbeting the shanks of the posts, as seen at 5 and 6 in Fig. 3 for the front toe-post, 7 and 8 in Fig. 5 for the heel-post, and 9 and 10 in Fig. 1 for the quarter-posts, in which grooves the base is fitted as shown.

At 11 are shown short points adapted to sufficiently prick the hoof to hold it from slipping.

In Figs. 4 and 5 we have shown a modified form of heel-post which, instead of being of a solid piece S, with the upper plate S', as shown in the other figures, is in the form of an open post S'', with a screw T', having a milled head T''. This screw is grooved to receive the point of a screw U' to permit the screw T' to revolve without shifting longitudinally. A threaded block U'' is fitted to slide in the post S'' and is adjusted up and down by the screw T', which passes through it. The plate S' is attached to this block and is thereby made adjustable up and down to adopt itself to the different heights of the clefts of the frog of different hoofs. This height is shown in inches by the scale U''' and the reading-line u.

Referring again to the toe-post it will be seen that it carries a fixed pointer Q' and a pivoted combined rule and protractor Q'', the rule having a scale of inches R' and the protractor a scale of degrees R''. By means of the scale of inches we are enabled to measure the length of the hoof along the front or toe line, and by means of the protractor and pointer we determine the angle of the hoof along such line.

From the above the purposes and operation of our instrument will be understood when taken in connection with the following: In using the instrument the horse's foot is placed upon it, and then the screw-head O is manipulated until the hoof is jointly clamped by the toe and heel posts. The length of the hoof is then read from the scales E and F. The length of the toe-line is then also read from the scale R', and the angle of the toe-line is taken from the scale R'' of the protractor. Then, or previous to such readings, the screw-head T is manipulated and the heel-post made to jointly clamp the quarters of the hoof. The width of the hoof at such lines is then read on the scales G or H. The height of the hoof at the quarters is read from the scales Y, and as there is one scale for each side any difference in the height of one side from the other is detected. Then by adjusting the plates K inward the inclination of the quarters is read on the scale Z of degrees, and if there is any discrepancy in the two sides such discrepancy is noted in degrees. The height of the cleft of the frog is also indicated by the scale U''' when the modified form of heel-post is used.

One of the most important things to be detected is whether the bottom or tread of the hoof is transversely perpendicular to the line of the center of gravity. This is shown by the scales Y, and if one quarter is lower than the other it is known that the hoof is "run over" at one side and that it is not perpendicular in a transverse direction to such curved line. This is serious, and should be corrected to avoid straining the anatomy of the joint in the hoof.

Thus it will be seen that with our improved instrument every possible measurement may be taken with the hoof and any abnormal conditions detected, so that they may be corrected by the proper trimming or paring of the hoof. We have constructed the implement here described and subjected it to practical tests.

Having thus fully described our invention, what we claim as new, and desire to secure by Letters Patent, is—

1. In an instrument for measuring horsehoofs, the combination with a base, of a toe-post, a heel-post, and quarter-posts, and a common means engaging with the heel and toe posts, and another common means engaging with the quarter-posts, whereby upon operating the first-named means the toe and heel posts are adjusted and upon operating the latter means the quarter-posts are simultaneously adjusted, and suitable scales to indicate one or more of the following dimensions: the length of the hoof, the width of the hoof, angle and length of the toe and the height of the heel and quarter, and the angle of the quarters.

2. In an instrument for measuring horsehoofs, the combination with a base, of a toe-post, a heel-post and quarter-posts, a right and left hand screw-threaded shaft for adjusting the two first-mentioned posts, and a similar shaft for adjusting the two second-mentioned posts and one or more scales for indicating the following dimensions, the length and inclination of the toe, the length of the hoof, the width of the hoof, the angle of the quarters and the height of the quarters and heels.

3. In an instrument for measuring horsehoofs, the combination with a base, of quarter-posts and means engaging said posts for adjusting them laterally for different-sized hoofs, and one or more suitable scales to indicate the width of the hoof and the height and angle of the quarters.

4. In an instrument for measuring horsehoofs, the combination with the base, of quarter-posts, a right and left hand screw-threaded shaft engaging with the posts to adjust them laterally, one or more scales to indicate the width of the hoof, a pointer and a measuring-plate forming part of each post, the scales to indicate the height and angle of the quarters.

5. In an instrument for measuring horsehoofs, the combination with the base, of quarter-posts, and means to vary the space between them, and suitable scales to indicate such space and to indicate the height of the quarter on either side.

6. In an instrument for measuring horsehoofs, a quarter-post consisting of a post proper, a stationary pointer on said post and a measuring-blade pivoted to said post, the blade having scales for inches and degrees and being adjustable to the angles of different quarters.

7. In an instrument for measuring horsehoofs, the combination with a suitable base having a slot therein, of a heel-post consisting of a post proper, a screw and a plate operated by the screw and adapted to come in contact with the frog-cleft, and a scale to indicate the height of the plate, and operating mechanism engaging the lower end of said post proper and adapted to move said heel-post for various-sized hoofs, substantially as shown and described whereby up and down and longitudinal adjustments are effected.

8. In an instrument for measuring horsehoofs, the combination with the base having a hub, two right and left hand threaded shafts rotatably mounted in a hub, one lengthwise and the other crosswise the base, a slidable toe-post and a heel-post engaged by one shaft, and slidable quarter-posts engaged by the other shaft, all of said posts being adjustable to and from said hub, and suitable scales for indicating one or more of the following dimensions: the length and width of the hoof, the length of the toe and its angle, the height of the frog-cleft and the quarters and the angle of the quarters, substantially as shown and described.

In testimony whereof we affix our signatures in presence of two witnesses.

PATRICK JAMES KEARNS.
JOSEPH N. KELLY.

Witnesses:
JAS. C. DAWLEY,
W. M. MCNAIR.